US010207700B2

(12) United States Patent
Kaneko et al.

(10) Patent No.: US 10,207,700 B2
(45) Date of Patent: Feb. 19, 2019

(54) HYBRID TYPE WORK VEHICLE

(71) Applicant: KCM CORPORATION, Kako-gun, Hyogo (JP)

(72) Inventors: Satoru Kaneko, Naka (JP); Kazuo Ishida, Ryugasaki (JP); Noritaka Ito, Ushiku (JP); Takashi Ikimi, Hitachi (JP)

(73) Assignee: KCM Corporation, Hyogo (JP)

( * ) Notice: Subject to any disclaimer, the term of this patent is extended or adjusted under 35 U.S.C. 154(b) by 0 days.

(21) Appl. No.: 15/560,936

(22) PCT Filed: Dec. 18, 2015

(86) PCT No.: PCT/JP2015/085580
§ 371 (c)(1),
(2) Date: Sep. 22, 2017

(87) PCT Pub. No.: WO2016/151965
PCT Pub. Date: Sep. 29, 2016

(65) Prior Publication Data
US 2018/0079404 A1    Mar. 22, 2018

(30) Foreign Application Priority Data

Mar. 25, 2015 (JP) .................. 2015-062996

(51) Int. Cl.
*B60L 9/00* (2006.01)
*B60L 11/00* (2006.01)
(Continued)

(52) U.S. Cl.
CPC .............. *B60W 20/13* (2016.01); *B60K 6/22* (2013.01); *B60K 6/46* (2013.01); *B60L 11/14* (2013.01);
(Continued)

(58) Field of Classification Search
CPC ..... B60W 20/13; B60W 2300/17; B60K 6/22; E02F 9/2075
(Continued)

(56) References Cited

U.S. PATENT DOCUMENTS

2013/0317684 A1* 11/2013 Kaneko ................ E02F 9/2075
701/22
2014/0188320 A1    7/2014 Moriki et al.

FOREIGN PATENT DOCUMENTS

EP    1 720 244 A1    11/2006
EP    1 834 854 A2     9/2007
(Continued)

OTHER PUBLICATIONS

International Preliminary Report on Patentability (PCT/IB/338 & PCT/IB/373) issued in PCT Application No. PCT/JP2015/085580 dated Oct. 5, 2017, including English translation of document C2 (Japanese-language Written Opinion (PCT/ISA/237)) previously filed on Sep. 22, 2017 (9 pages).
(Continued)

*Primary Examiner* — Mahmoud S Ismail
(74) *Attorney, Agent, or Firm* — Crowell & Moring LLP (57) ABSTRACT

A hybrid type work vehicle includes a power source, a traveling unit, a hydraulic work unit, an accelerator pedal, a brake pedal, an operation lever device, and a control apparatus. The control apparatus is configured such that when the current operation state is determined to be that of an excavation work which is a combined operation of the traveling unit and the hydraulic work unit and the output power limitation signal is outputted, the control apparatus limits the output power of the traveling unit. The control apparatus is also configured to decrease the tilting angle of the hydraulic pump, such that a ratio between the output power of the
(Continued)

traveling unit and the output power of the hydraulic work unit is maintained at a preset ratio.

3 Claims, 9 Drawing Sheets

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60W 20/13* | (2016.01) | |
| *B60K 6/46* | (2007.10) | |
| *B60L 11/14* | (2006.01) | |
| *B60L 11/18* | (2006.01) | |
| *B60W 10/08* | (2006.01) | |
| *B60W 10/30* | (2006.01) | |
| *B60W 20/00* | (2016.01) | |
| *E02F 9/20* | (2006.01) | |
| *B60K 6/22* | (2007.10) | |
| *E02F 3/42* | (2006.01) | |

(52) U.S. Cl.
CPC .............. *B60L 11/18* (2013.01); *B60W 10/08* (2013.01); *B60W 10/30* (2013.01); *B60W 20/00* (2013.01); *E02F 9/20* (2013.01); *E02F 9/2075* (2013.01); *B60W 2300/17* (2013.01); *B60Y 2200/412* (2013.01); *B60Y 2200/92* (2013.01); *E02F 3/422* (2013.01); *Y02T 10/6217* (2013.01); *Y02T 10/7005* (2013.01); *Y02T 10/7077* (2013.01); *Y10S 903/904* (2013.01); *Y10S 903/93* (2013.01)

(58) Field of Classification Search
USPC .......................................................... 701/22
See application file for complete search history.

(56) References Cited

FOREIGN PATENT DOCUMENTS

| | | |
|---|---|---|
| JP | 2005-9381 A | 1/2005 |
| JP | 2013-39875 A | 2/2013 |
| WO | WO 2012/114782 A1 | 8/2012 |

OTHER PUBLICATIONS

International Search Report (PCT/ISA/210) issued in PCT Application No. PCT/JP2015/085580 dated Mar. 8, 2016 with English translation (Four (4) pages).
Japanese-language Written Opinion (PCT/ISA/237) issued in PCT Application No. PCT/JP2015/085580 dated Mar. 8, 2016 (Five (5) pages).
Extended European Search Report issued in counterpart European Application No. 15886517.0 dated Oct. 10, 2018 (eight pages).

\* cited by examiner

HYBRID TYPE WORK VEHICLE

TECHNICAL FIELD

The present invention relates to a hybrid type work vehicle.

BACKGROUND ART

In recent years, in view of environmental issues, high oil price, etc., there is an increasing demand for energy-saving-oriented industrial products. This also applies to the field of construction vehicles, work vehicles, etc., which have conventionally been mainly based on a hydraulic drive system using a diesel engine. There are many instances in which high efficiency and energy saving have been achieved through electrification. For example, in the case where the drive portion of a construction vehicle or a work vehicle is electrified, that is, in the case where an electric motor is employed as the drive source, there are to be expected, apart from a reduction in exhaust gas, many energy-saving effects, such as a high-efficiency drive of the engine (in the case of a hybrid type machine), an improvement in terms of power transmission efficiency, and recovery of regenerated electric power. Thus, in the field of the hydraulic excavator, engine-driven forklift, etc., there are being commercialized "hybrid vehicles" in which a diesel engine and an electric motor are combined with each other.

Among such construction vehicles and work vehicles, the drive portions of which have been electrified, is a wheel loader, of which a relatively high fuel reducing effect is to be expected when it is produced as a hybrid vehicle. The conventional wheel loader is, for example, a work vehicle which excavates and transports earth and sand or the like with a bucket portion of a hydraulic work unit mounted to the front portion of the vehicle while performing traveling by transmitting the power of an engine to tires via a torque converter and a transmission (T/M). If the traveling drive portion of such a wheel loader is electrified, it is possible to improve the power transmission efficiency of the traveling unit consisting of a torque converter, a transmission, and the like to the level of power transmission efficiency based on electricity. Further, in the wheel loader, the traveling operation of starting/stopping is frequently repeated, so that, if the traveling drive portion is electrified, recovery of regenerated electric power from the traveling electric motor at the time of braking is to be expected.

Regarding such a hybrid wheel loader, there has been disclosed one in which the power supplied from the engine and the power storage device is properly controlled in order to suppress the deterioration in driving comfort attributable to the distribution of the power to the hydraulic pump and the traveling electric motor (see, for example, Patent Document 1). More specifically, when the demanded power of the work vehicle is larger than the available output power of the hybrid system, the actual hydraulic power of the hydraulic pump is increased to the required value under a certain limitation and, at the same time, the traveling power is reduced from the required value by a value equal to or less than the limitation.

PRIOR ART DOCUMENT

Patent Document

Patent Document 1: JP-2013-39875-A

SUMMARY OF THE INVENTION

Problem to be Solved by the Invention

In the above conventional technique, when the demanded power of the work vehicle is larger than the available output power of the hybrid system, the hydraulic power is increased to the required value under a certain limitation and, at the same time, the traveling power from the power storage device is reduced from the required value by a value equal to or less than the limitation. Thus, when such a limitation in output power is generated, the ratio of the hydraulic power to the traveling power in the work vehicle is increased.

When excavating the object of excavation such as a heap of gravel by the wheel loader, the wheel loader is first caused to advance toward the object of excavation, and the bucket is thrust into the object of excavation so as to penetrate it. Then, the wheel loader retreats while lifting up the bucket loaded with the gravel or the like. In this excavation work, when causing the bucket to penetrate the object of excavation, it is important to control the traveling output power of the wheel loader, and, when lifting up the bucket, it is important to control the hydraulic output power. More specifically, it is necessary to thrust and penetrate the bucket into the object of excavation with the proper traveling output power. When the traveling output power is small, the bucket is not penetrated into the object of excavation to a sufficient degree, resulting in deterioration in operational efficiency.

In the case of the hybrid wheel loader according to the above-described prior-art technique, when a limitation in output power is generated, the hydraulic power is increased whereas the traveling power is reduced. Thus, in the excavation work, when a limitation in output power is generated, the traveling power is reduced, so that there is a shortage of power when penetrating the bucket into the object of excavation. As a result, it is impossible to load the bucket with the carrying object to a sufficient degree, so that there is a fear of deterioration in operational efficiency.

The present invention has been made in view of the above circumstances. It is an object of the present invention to provide a hybrid type work vehicle the traveling drive portion of which is electrified and in which, even in the case where the output power of the hybrid system is limited due to the output power limitation, etc. of the power storage device with respect to the required power of the vehicle, the operational efficiency is high.

Means for Solving the Problem

To achieve the above object, there is adopted, for example, the construction as claimed in the appended claims. The present application includes a plurality of means for achieving the above object, an example of which includes: a power source including an engine and a power storage device; a traveling unit having a generator motor connected to an output shaft of the engine, an wheel, a traveling electric motor driving the wheel, and an inverter transferring electric power between the power storage device and each of the generator motor and the traveling electric motor; a hydraulic work unit having a hydraulic pump connected to a rotation shaft of the generator motor, a plurality of hydraulic actuators driven by a hydraulic fluid supplied from the hydraulic pump, and an operation lever device commanding the driving of the plurality of hydraulic actuators; an accelerator pedal controlling a revolution speed of the engine; a brake pedal controlling a braking device of the wheel; and a control apparatus having an operation determination section configured to input an operation amount of the operation lever device, a depression amount of the accelerator pedal and the brake pedal, and a vehicle speed and to determine a current operation state of the vehicle, and a power computation section configured to input an output value of the engine and an output value of the power storage device and to calculate and control a power of the traveling unit and a power of the hydraulic work unit. The control apparatus is configured such that when the operation determination section determines that the current vehicle operation state is that of an excavation work which is a combined operation of the traveling unit and the hydraulic work unit, the power computation section calculates and controls output power of the traveling unit and output power of the hydraulic work unit such that a sum total of the output value of the engine and the output value of the power storage device is distributed in a preset ratio.

Effect of the Invention

According to the present invention, it is possible to provide a hybrid type work vehicle the traveling drive portion of which is electrified and in which the operational efficiency is high even in the case where the output power of the hybrid system is limited due to the output power limitation, etc. of the power storage device with respect to the required power of the vehicle.

MODES FOR CARRYING OUR THE INVENTION

In the following, embodiments of the present invention will be described with reference to the drawings taking a hybrid type wheel loader as an example of the hybrid type work vehicle.

Embodiment 1

Figure 1:
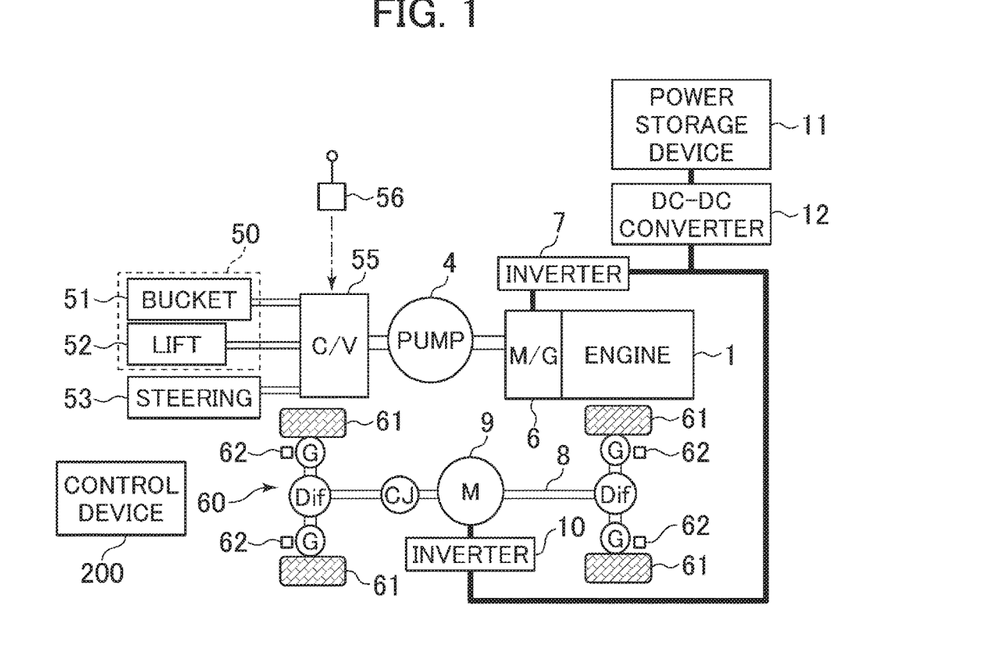
FIG. 1 is a diagram illustrating the system configuration of a wheel loader to which a hybrid type work vehicle according to a first embodiment of the present invention is applied.
Figure 2:
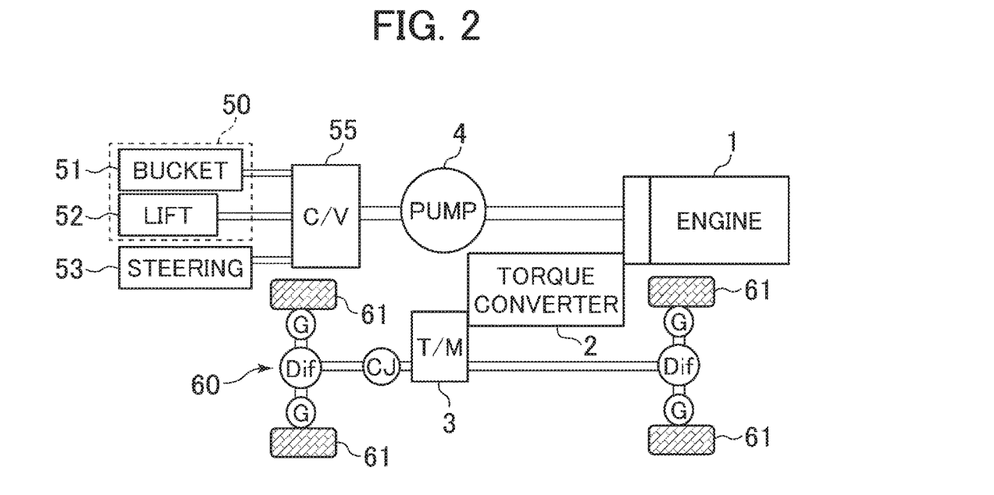
FIG. 2 is a diagram illustrating a typical system configuration of a conventional wheel loader.
Figure 3:
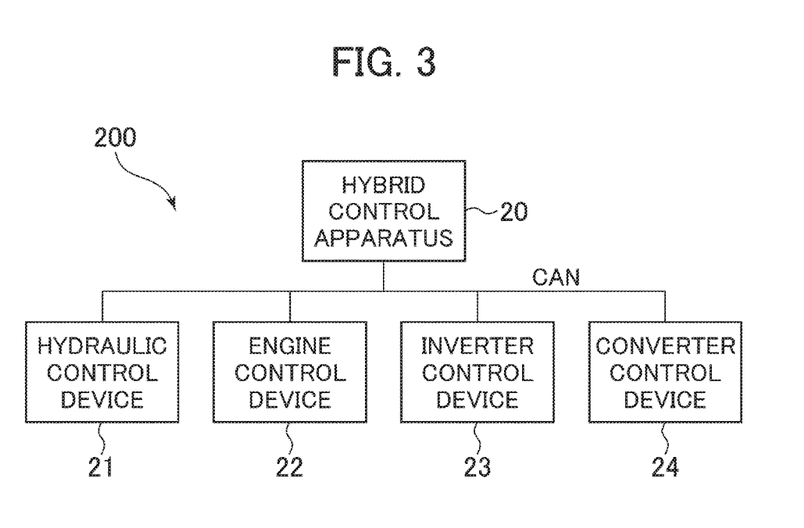
FIG. 3 is a diagram illustrating the construction of a control system constituting the hybrid type work vehicle according to the first embodiment of the present invention.
Figure 4:
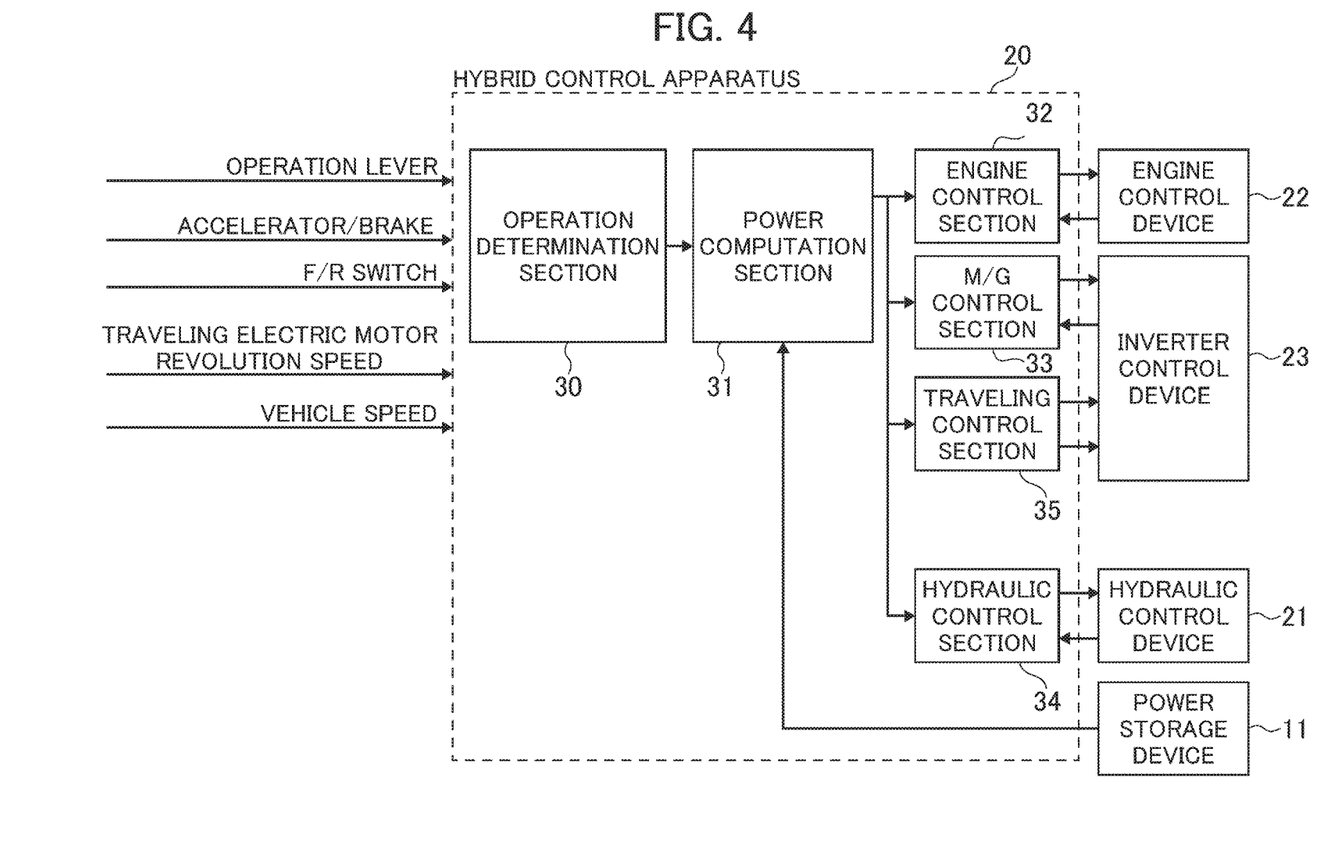
FIG. 4 is a block diagram illustrating the construction of a hybrid control apparatus constituting the hybrid type work vehicle according to the first embodiment of the present invention.

FIG. 1 is a diagram illustrating the system configuration of a wheel loader to which a hybrid type work vehicle according to a first embodiment of the present invention is applied. FIG. 2 is a diagram illustrating a typical system configuration of a conventional wheel loader. FIG. 3 is a diagram illustrating the construction of a control system constituting the hybrid type work vehicle according to the first embodiment of the present invention. FIG. 4 is a block diagram illustrating the construction of a hybrid control apparatus constituting the hybrid type work vehicle according to the first embodiment of the present invention.

The hybrid type wheel loader shown in FIG. 1 is equipped with, as the power source, an engine 1 and a power storage device 11, and has, as the main drive portions, an electrified traveling unit (wheel portion) and a hydraulic work unit (lift/bucket portion) at the front. The traveling unit of the hybrid type wheel loader is equipped with a generator motor (motor/generator (M/G)) 6 connected to the output shaft of the engine 1, an inverter 7 controlling the generator motor 6, a track structure 60 having four wheels 61, a traveling electric motor 9 mounted to a propeller shaft 8 of the track structure 60 and driving the four wheels 61, an inverter 10 controlling the traveling electric motor 9, a DC-DC converter 12 performing raising/lowering control of the output voltage of the power storage device 11, and a control system 200.

The hydraulic work unit of the hybrid type wheel loader is equipped with a variable displacement hydraulic pump 4 connected to the rotation shaft of the generator motor 6, a work device 50 having a bucket and a lift arm (not shown) and mounted to the front portion of the vehicle body, hydraulic actuators (a bucket cylinder 51, a lift cylinder 52, and a steering cylinder 53) driven by a hydraulic fluid supplied from the hydraulic pump 4 via a control valve 55, and operation devices (an operation lever device 56 and a steering wheel which is not shown) outputting an operation signal for driving the hydraulic actuators 51, 52, and 53 in accordance with the operation amount.

The bucket cylinder 51 and the lift cylinder 52 are driven based on an operation signal (hydraulic signal) outputted in accordance with the operation amount of the operation lever device 56 installed in the cab. The lift cylinder 52 is mounted to a lift arm rotatably fixed to the front portion of the vehicle body and undergoes expansion/contraction based on an operation signal from the operation lever device 56 to vertically rotate the lift arm. The bucket cylinder 51 is mounted to the bucket rotatably fixed to the distal end of the lift arm and undergoes expansion/contraction based on the operation signal from the operation lever device 56 to vertically rotate the bucket. The steering cylinder 53 is driven based on the operation signal (hydraulic signal) outputted in accordance with the steering amount of the steering wheel (not shown) installed in the cab. The steering cylinder 53 is connected to the wheels 61 and undergoes expansion/contraction based on an operation signal from the steering wheel to change the steering angle of the wheels 61. In the vicinity of the wheels 61, there are arranged speed sensors 62 detecting the revolution speed.

As the power storage device 11, it is desirable to adopt a large capacity power storage device such as a lithium battery or an electric double layer capacitor. The power storage device 11 of the present embodiment performs the raising/lowering control of the system voltage of the DC bus portion by the DC-DC converter 12 and transfers DC electric power between the inverters 7 and 10 (i.e., the generator motor 6 and the traveling electric motor 9).

In the hybrid type wheel loader, constructed as described above, the hydraulic fluid is supplied as appropriate from the variable displacement hydraulic pump 4 to the work device 50 for performing the work of excavating earth, sand and the like, whereby a work according to the object is executed. The traveling operation of the track structure 60 is performed by driving the traveling electric motor 9 through utilization of the electric power generated at the generator motor 6 mainly by the power of the engine 1. In this process, the power storage device 11 absorbs the regenerated electric power generated by the traveling electric motor 9 at the time of braking the vehicle, and supplies stored electric power to the generator motor 6 or the traveling electric motor 9 to perform output assist with respect to the engine 1, thereby contributing to a reduction in the energy consumption of the vehicle and a reduction in the size of the engine 1. The hybrid system to which the present invention is directed is not restricted to the construction example of FIG. 1 but is also applicable to various system configurations such as a traveling unit parallel type system.

The conventional wheel loader shown in FIG. 2 has, as the main drive portions, the traveling unit (wheel portion) and the hydraulic work unit (lift/bucket portion) at the front. It performs traveling by transmitting the power of the engine 1 to the wheels 61 via a torque converter 2 and a transmission (T/M) 3, and, further, excavates/transports earth, sand, and the like with the work device 50 driven by the hydraulic pump 4. The power transmission efficiency of the torque converter is inferior to that of the electrical power transmission, so that when the traveling drive portion of the wheel loader shown in FIG. 2 (including the parallel type hybrid construction) is electrified, it is possible to improve the power transmission efficiency of the power from the engine 1. Further, in the wheel loader during work, the traveling operation of starting/stopping is frequently repeated. Thus, in the case where the traveling drive portion is electrified as above, the recovery of the regenerated electric power at the time of braking from the traveling electric motor 9 is to be expected. In this way, when a part of the drive device of the wheel loader is electrified and made hybrid, it is generally possible to reduce the fuel consumption amount by approximately several tens of percent.

As shown in FIG. 3, in the hybrid type wheel loader according to the present invention, there are mounted, as a control system 200, a hybrid control apparatus 20 which is a controller that performs the control of the energy flow, power flow, etc. in the entire hybrid system shown in FIG. 1, a hydraulic control device 21 controlling a control valve (C/V) 55 and the hydraulic pump 4, an engine control device 22 controlling the engine 1, an inverter control device 23 controlling the inverters 7 and 10, and a converter control device 24 controlling the DC-DC converter 12.

Each of the control apparatus and devices 20, 21, 22, 23, and 24 is equipped with a storage device (RAM, ROM, etc.) (not shown) storing processing details and processing results, and a processing device (CPU or the like) (not shown) executing the processing stored in the storage device. Further, the control apparatus and devices 20, 21, 22, 23, and 24 are connected to each other via a controller area network (CAN), mutually transmitting and receiving the command value and the condition amount of each apparatus. As shown in FIG. 3, the hybrid control apparatus 20 ranks higher than the hydraulic control device 21, the engine control device 22, the inverter control device 23, and the converter control device 24, and controls the entire system, imparting a specific operation command to each of the other control devices 21 through 24 such that the system as a whole exerts an optimum work performance.

As the control apparatus and devices 20 through 24 shown in FIG. 3, there are solely shown the requisite controllers for controlling each drive portion of the hybrid system shown in FIG. 1. When actually completing the vehicle, it is necessary to provide other controllers such as a monitor-related controller and an information-related controller. Such other controllers are not shown in the drawing since they are not directly related to the present invention. Further, as shown in FIG. 3, it is not always necessary for each of the control apparatus and devices 20 through 24 to be separate from the other control apparatus and devices. One control device may implement two or more control functions.

As shown in FIG. 4, the hybrid control apparatus 20 is equipped with an operation determination section 30 determining the details of the current operation of the wheel loader, a power computation section 31 distributing the output power of the engine 1 and the output power of the power storage device 11 to the drive portions, an engine control section 32 determining the revolution speed command for the engine 1 in accordance with the demanded output value of the entire vehicle, an M/G control section 33 determining the torque command for the generator motor 6 in accordance with the required generation value, a hydraulic control section 34 computing the tilting angle command value of the hydraulic pump 4 from the required power value of the hydraulic pump 4 computed from the operation amount, etc. of the operation lever device 56, and a traveling control section 35 computing the torque command for the traveling electric motor 9 from the traveling power requirement value computed from the accelerator/brake pedal operation amount and the current vehicle speed.

The hybrid control apparatus 20 inputs an operation signal outputted from the operation lever device 56, the depression amount of the accelerator pedal and the brake pedal installed in the cab, a switch signal (F/R signal) outputted from an F/R switch for selection between forward and rearward as the moving direction of the vehicle and indicating the switch position (forward or rearward), the vehicle speed computed from the revolution speed of the wheels 61 detected by the speed sensors 62, and the revolution speed of the traveling electric motor 9 outputted from the inverter 10. The accelerator pedal serves to control the revolution speed of the engine 1, and the brake pedal serves to control a brake device (not shown) of the wheels 61. Further, various condition amounts such as voltage and current and electric power limitation value of the power storage device 11 are inputted from the power storage device 11 to the power computation section 31 to execute charge/discharge control such that the power storage device 11 may not be placed in an abnormal condition such as over-discharge and over-charge.

In this way, the hybrid system of the present embodiment has, as the power source for driving the vehicle, the engine 1 and the power storage device 11. The power computation section 31 of the hybrid control apparatus 20 determines the final traveling unit power and hydraulic work unit power in accordance with the condition of the engine 1 and the power storage device 11 with respect to the requirement power of the vehicle approximately corresponding to the sum total of the power requirement value Pf of the work device 50 and the power requirement value Prun of the traveling electric motor 9.

Figure 5:
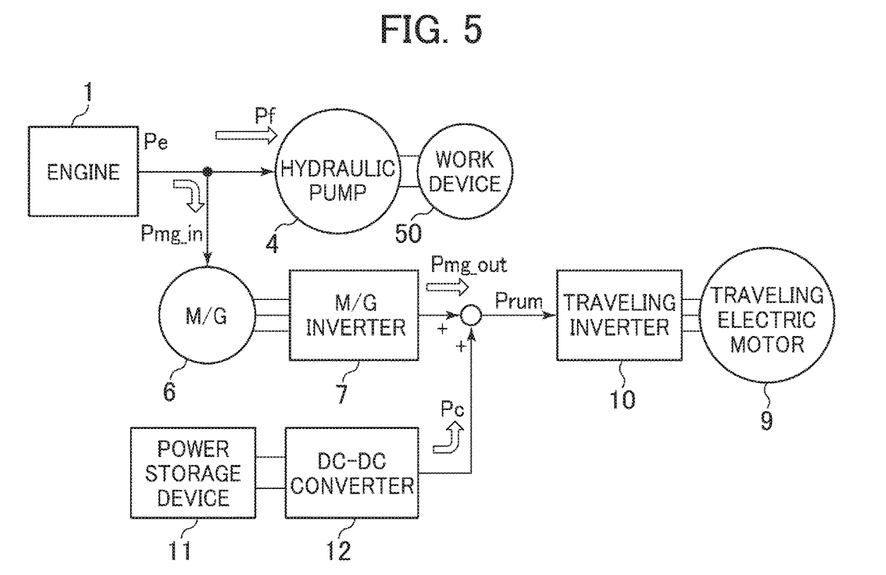
FIG. 5 is a schematic diagram illustrating the power flow in a hybrid system of the hybrid work vehicle according to the first embodiment of the present invention.

FIG. 5 is a schematic diagram illustrating the power flow in a hybrid system of the hybrid work vehicle according to the first embodiment of the present invention. Here, symbols Pmg_in and Pmg_out respectively indicate the input power and the output power of the generator motor 6. Symbols Pe and Pc respectively indicate the output power value of the engine 1 and the output power value of the power storage device 11. Here, the power computation section 31 of the hybrid control apparatus 20 of the present invention distribute the engine output power Pe and the power storage device output power Pc to the output power Pf of the work device 50 and the output power Prun of the traveling electric motor 9 in accordance with equations (1) and (2) given below. At the same time, it determines the final traveling unit power and hydraulic work unit power in accordance with the current operation state of the wheel loader determined by the operation determination section 30 and the condition of the engine 1 and the power storage device 11. In accordance with the final traveling unit power and hydraulic work unit power, the hybrid control apparatus 20 imparts a command value to the work device 50 and the traveling electric motor 9.

$$Pf = Pe - Pmg\_in \qquad (1)$$

$$Prun = Pmg\_out + Pc \qquad (2)$$

The wheel loader to which the present invention is directed has some basic operation patterns, and it is necessary for the hybrid control apparatus 20 to operate the vehicle in an optimum way in accordance with the operations. For example, the most typical work pattern is a V-shaped excavating/loading work.

Figure 6:
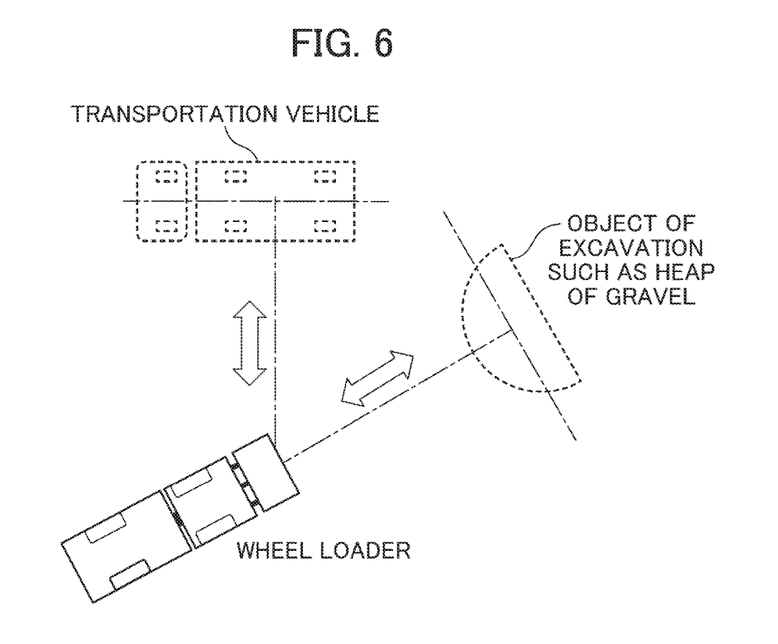
FIG. 6 is a schematic diagram illustrating a V-shaped excavating/loading work which is an example of the work pattern of the wheel loader.

FIG. 6 is a schematic diagram illustrating a V-shaped excavating/loading work which is an example of the work pattern of the wheel loader. The V-shaped excavating/loading work is a main operation pattern which occupies around 70% or more of all the actual work of the wheel loader. This consists of following works: an excavating work in which the wheel loader is caused to advance toward an object of excavation such as a heap of gravel and in which the bucket is thrust into the object of excavation so as to penetrate it to load the bucket with gravel or the like; a loaded-traveling work in which, after the completion of the excavating work, the wheel loader retreats to the former position while lifting the bucket and in which the wheel loader turns the advancing direction to a transportation vehicle, and advances toward it to raise the bucket to a vessel of the transportation vehicle; a damping work in which the gravel or the like in the bucket is discharged and loaded onto the transportation vehicle; and an empty-traveling work in which, after the completion of the damping work, the wheel loader retreats to the former position and in which the wheel loader turns to the object of excavation such as the heap of gravel. In this way, the wheel loader repeatedly performs the excavating/loading work while drawing a V-shaped locus.

Figure 7:
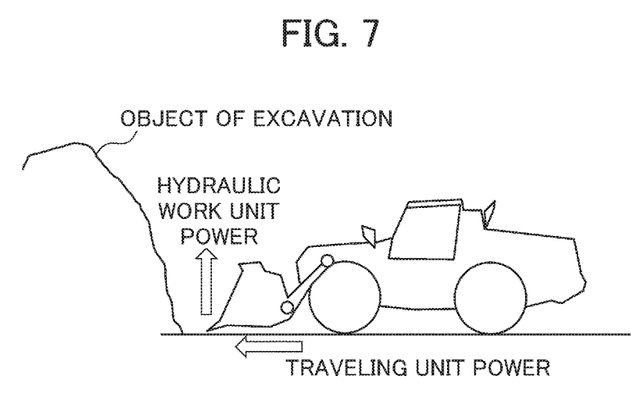
FIG. 7 is a schematic diagram illustrating the traveling unit power and the hydraulic work unit power during excavation work of the hybrid type work vehicle according to the first embodiment of the present invention.

FIG. 7 is a schematic diagram illustrating the traveling unit power and the hydraulic work unit power during excavation work of the hybrid type work vehicle according to the first embodiment of the present invention. In particular, regarding the excavating work of the V-shaped excavating/loading work conducted by the hybrid type wheel loader, it is necessary to perform power distribution properly between the traveling unit power and the hydraulic work unit power of the work device 50 shown in FIG. 7. For example, when performing the above-described excavating work, if the distribution is such that the traveling unit power is excessive with respect to the hydraulic work unit power, the hybrid type wheel loader thrusts the bucket too deep into the object of excavation, and an excessively heavy carrying object such as gravel is placed in the bucket. At this time, the hydraulic work unit power is relatively small as compared with the traveling unit power, so that there is the possibility of the bucket being unable to be lifted up. On the other hand, if the distribution is such that the traveling unit power is excessively small as compared with the hydraulic work unit power, the hybrid type wheel loader cannot thrust the bucket so much into the object of excavation. At the same time, the hydraulic work unit power is relatively large as compared with the traveling unit power, so that there is the possibility of the bucket rising speed being increased. As a result, it is to be expected that the carrying object cannot be loaded efficiently.

Thus, when performing the above-described excavating work by the hybrid type wheel loader, it is effective to previously set an optimum distribution between the traveling unit power and the hydraulic work unit power of the work device 50. It will be most effective to determine this optimum distribution ratio between the traveling unit power and the hydraulic work unit power in accordance with the work performance of the actual vehicle. This, however, is not to be fixed to a certain specific distribution ratio but may have a permissible fluctuation range to a certain degree. It should be noted, however, that, in an excavating work, setting of an unbalanced power distribution biased to one of the traveling unit and the hydraulic work unit obviously results in deterioration in operational efficiency.

In this way, in the hybrid type wheel loader, in order to achieve an improvement in terms of operational efficiency, it is necessary to set an optimum power distribution between the traveling unit and the hydraulic work unit in accordance with each work condition. To realize such an operation, the hybrid type wheel loader according to the present embodiment is equipped with the operation determination section 30 and the power computation section 31 in the hybrid control apparatus 20.

Figure 8:
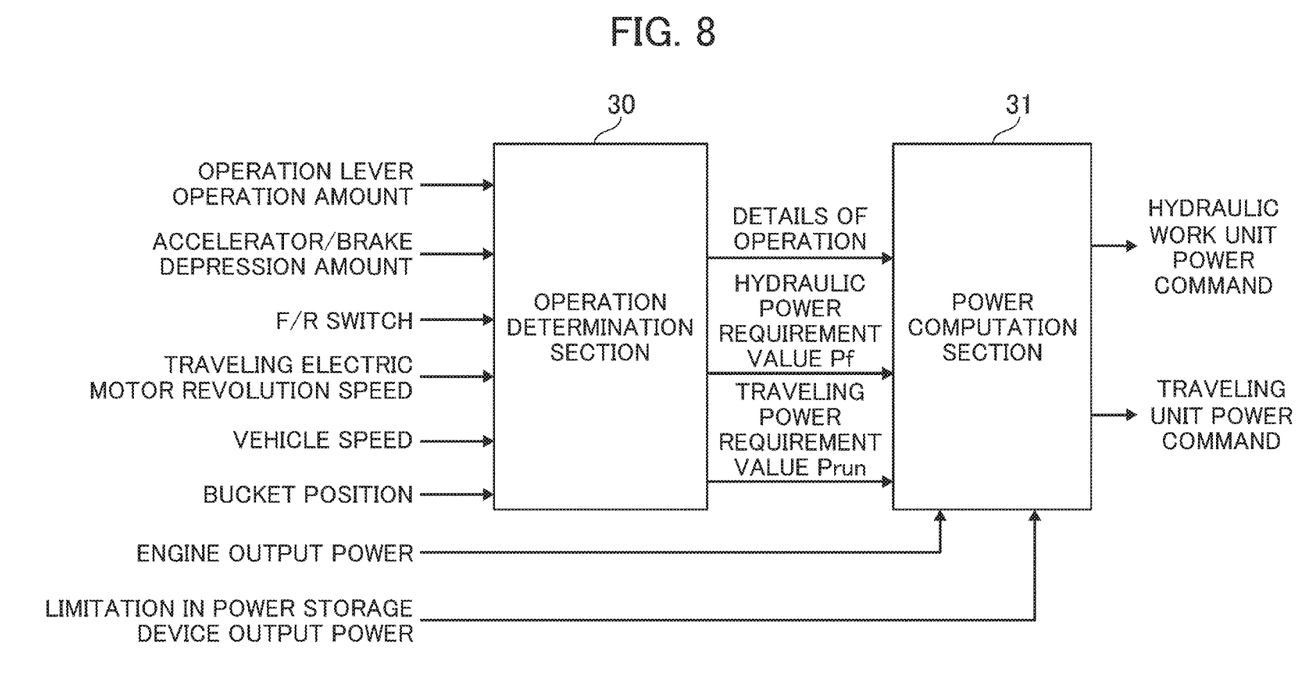
FIG. 8 is a block diagram illustrating the input/output relationship between an operation determination section and a power computation section of the hybrid type work vehicle according to the first embodiment of the present invention.

FIG. 8 is a block diagram illustrating the input/output relationship between an operation determination section and a power computation section of the hybrid type work vehicle according to the first embodiment of the present invention. Inputted to the operation determination section 30 is information on the vehicle operation and the work, that is, the operation amount of the operation lever device 56, the depression amount of the accelerator pedal and the brake pedal, the switch signal of the F/R switch, the revolution speed of the traveling electric motor 9, the vehicle speed, and the bucket position signal. The operation determination section 30 determines the details of the current operation of the wheel loader based on these items of input information. Further, the determined details of the operation of the wheel loader, the hydraulic power requirement value Pf, and the traveling power requirement value Prun are outputted from the operation determination section 30 to the power computation section 31. Apart from the above-mentioned signals, inputted to the power computation section 31 are an output power limitation signal from the power storage device 11 and an engine output signal from the engine 1. In accordance with these input signals, the power computation section 31 determines the final traveling unit power and hydraulic work unit power.

Figure 9:
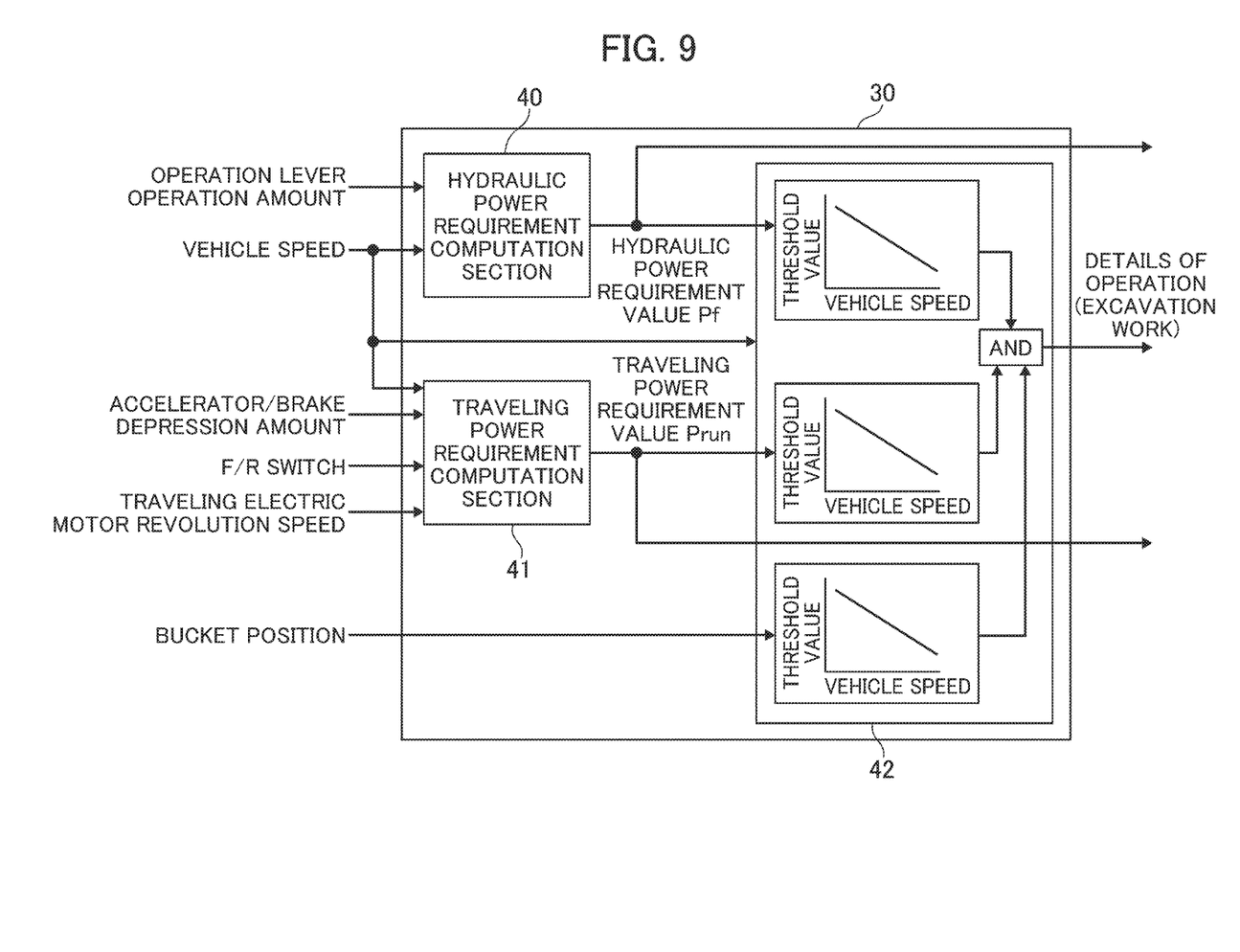
FIG. 9 is a block diagram illustrating the construction and processing details of the operation determination section of the hybrid type work vehicle according to the first embodiment of the present invention.

FIG. 9 is a block diagram illustrating the construction and processing details of the operation determination section of the hybrid type work vehicle according to the first embodiment of the present invention. As shown in FIG. 9, the operation determination section 30 is equipped with a hydraulic power requirement computation section 40, a traveling power requirement computation section 41, and an operation computation section 42.

The hydraulic power requirement computation section 40 inputs the operation amount of the operation lever device 56 and the vehicle speed, and computes the hydraulic power requirement value Pf. In a computation method adopted here, there is determined, for example, the operation of the work device 50 in accordance with the operation amount, and the power of the hydraulic pump 4 which can realize that operation is determined. Regarding the method of determining the power of the hydraulic pump 4, there are no particular restrictions. For example, the magnitude of the power may be determined beforehand in accordance with the operation amount of the operation lever device 56, making the determination through table search or the like in the control system. In this case, a tuning work or the like is advantageously easy to perform.

The traveling power requirement computation section 41 inputs the depression amount of the accelerator pedal and the brake pedal, the switch signal of the F/R switch, the revolution speed of the traveling electric motor 9, and the vehicle speed, and computes the traveling power requirement value Prun. Also regarding the computation method adopted here, the power in accordance with the depression amount of each pedal may be determined beforehand as in the case of the hydraulic power requirement value Pf, making the determination through table search or the like in the control system.

The operation computation section 42 inputs the vehicle speed, the bucket position signal, the hydraulic power requirement value Pf calculated by the hydraulic power requirement computation section 40, and the traveling power requirement value Prun calculated by the traveling power requirement computation section 41, and determines the details of the operation of the wheel loader. More specifically, it compares the input values with the threshold value of the hydraulic power requirement value Pf, the threshold value of the traveling power requirement value Prun, and the threshold value of the bucket position, which threshold values are previously set with respect to the vehicle speed, determining that the operation is the excavating work on condition that all of these input values are in excess of the threshold values.

As described above, the excavation work of the wheel loader is a combined operation of the traveling unit and the work unit in which the vehicle is caused to advance, with the bucket position being low, and in which the work device 50 is raised. Thus, as described above, it is possible to determine the excavating work of the wheel loader by monitoring the bucket position, the vehicle accelerating condition, and the hydraulic power requirement value Pf and the traveling power requirement value Prun required through the operation of the operator.

Referring back to FIG. 8, apart from the signals outputted from the operation determination section 30, inputted to the power computation section 31 are an output power limitation signal from the power storage device 11 and an engine output signal from the engine 1. For example, in the case where there is input a signal indicating that the operation is an excavating work, the power computation section 31 determines the traveling unit power and the work unit power such that the proper distribution as mentioned above is attained with respect to the hydraulic power requirement value Pf, the traveling power requirement value Prun, and the engine output power. In the case, for example, where there is an output power limitation signal from the power storage device 11, the final traveling unit power and hydraulic work unit power are determined and outputted through multiplication by a coefficient in accordance with the limitation value. Through this arrangement, during the excavating work of the wheel loader, the power of the traveling unit and that of the hydraulic work unit are distributed in an appropriate ratio. As a result, the operational efficiency during the excavating work is improved. Suppose, for example, the output power ratio between the traveling unit and the hydraulic work unit during the excavating work is set to 6:4 to 4:6 beforehand. In the case where the object of excavation (the heap of earth) is hard, the output power of the traveling unit is made larger as compared with the output power of the hydraulic work unit, and, in the case where the object of excavation (the heap of earth) is soft, the output power of the hydraulic work unit is made larger than that of the traveling unit.

The output power from the power storage device 11 is limited in the case, for example, where a lithium battery is used as the power storage device 11 constituting the hybrid system. The battery power output is limited, for example, when the temperature of the lithium battery is increased to exceed the threshold value, and when the value of the output electric current exceeds the threshold value. In such cases, in the present embodiment, the power computation section 31 shown in FIG. 8 inputs the details of the operation (excavating work) of the wheel loader, the traveling power requirement value Prun, and the hydraulic power requirement value Pf. Thus, instead of limiting solely the traveling unit power command, the hydraulic work unit power command is also adjusted such that the preset proper ratio between the traveling unit power and the hydraulic work unit power is maintained. As a result, it is possible to prevent deterioration in the operational efficiency of the excavating work.

In the case where the hydraulic work unit power command is limited, control is performed to decrease the tilting angle of the variable displacement hydraulic pump 4, for example, by the hydraulic control section 34 of the hybrid control apparatus 20 shown in FIG. 4 via the hydraulic control device 21.

Figure 10:
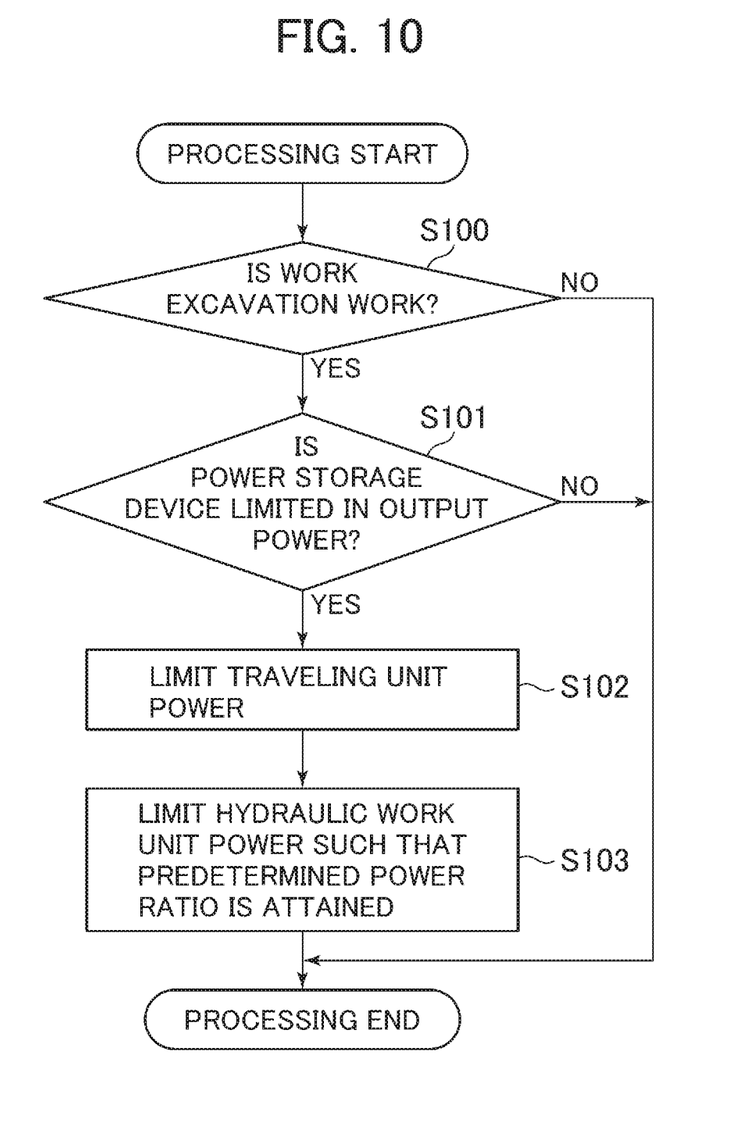
FIG. 10 is a flowchart illustrating the processing procedures for the hybrid control apparatus constituting the hybrid type work vehicle according to the first embodiment of the present invention.

Next, the details of the processing by the operation determination section 30 and the power computation section 31 will be described with reference to the drawings. FIG. 10 is a flowchart illustrating the processing procedures for the hybrid control apparatus constituting the hybrid type work vehicle according to the first embodiment of the present invention.

The operation determination section 30 of the hybrid control apparatus 20 determines whether or not the current work being performed by the wheel loader is an excavating work (step S100). More specifically, the operation computation section 42 of the operation determination section 30 inputs the vehicle speed, the bucket position signal, the hydraulic power requirement value Pf, and the traveling power requirement value Prun, and compares the input signals with the previously determined threshold values, whereby it is determined whether or not the current work is an excavating work. In the case where the current work being performed by the wheel loader is an excavating work, the operation determination section 30 advances to step S101. Otherwise, the processing is completed.

The power computation section 31 of the hybrid control apparatus 20 determines whether or not output power limitation for the power storage device 11 has been generated (step S101). More specifically, the power computation section 31 makes the determination based on whether or not an output power limitation command signal from the power storage device exists. For example, in the case where the temperature of the lithium battery has been increased to exceed the threshold value or in the case where the value of the output electric current exceeds the threshold value, the output power limitation command is outputted. In the case where it is determined that output power limitation for the power storage device 11 has been generated, the power computation section 31 advances to step S102. Otherwise, the processing is completed.

The power computation section 31 of the hybrid control apparatus 20 executes the limitation of the traveling unit power (step S102). More specifically, the power computation section 31 limits the traveling power requirement value Prun in accordance with the output power limitation amount from the power storage device 11, and outputs it as the traveling unit power command.

The power computation section 31 of the hybrid control apparatus 20 executes the limitation of the hydraulic work unit power such that the preset ratio between the traveling unit power and the hydraulic work unit power is attained (step S103). More specifically, the power computation section 31 limits the hydraulic power requirement value Pf to determine the hydraulic work unit power such that a predetermined power ratio may be attained with respect to the output-limited traveling unit power command, and outputs it as the hydraulic work unit power command.

By executing the above processing, it is possible to control the power ratio between the traveling unit and the hydraulic work unit in an optimum way even in the case where output power limitation is generated in the power storage device 11. As a result, it is possible to achieve an improvement in terms of operational efficiency in a condition in which the output power is limited.

In the hybrid type work vehicle according to the first embodiment of the present invention described above, it is possible to provide a hybrid type work vehicle of high operational efficiency even in the case where, in a hybrid type work vehicle the traveling drive portion of which is electrified, the output power of the hybrid system is limited due to output power limitation or the like for the power storage device 11 with respect to the demanded vehicle power.

Embodiment 2

Figure 11:
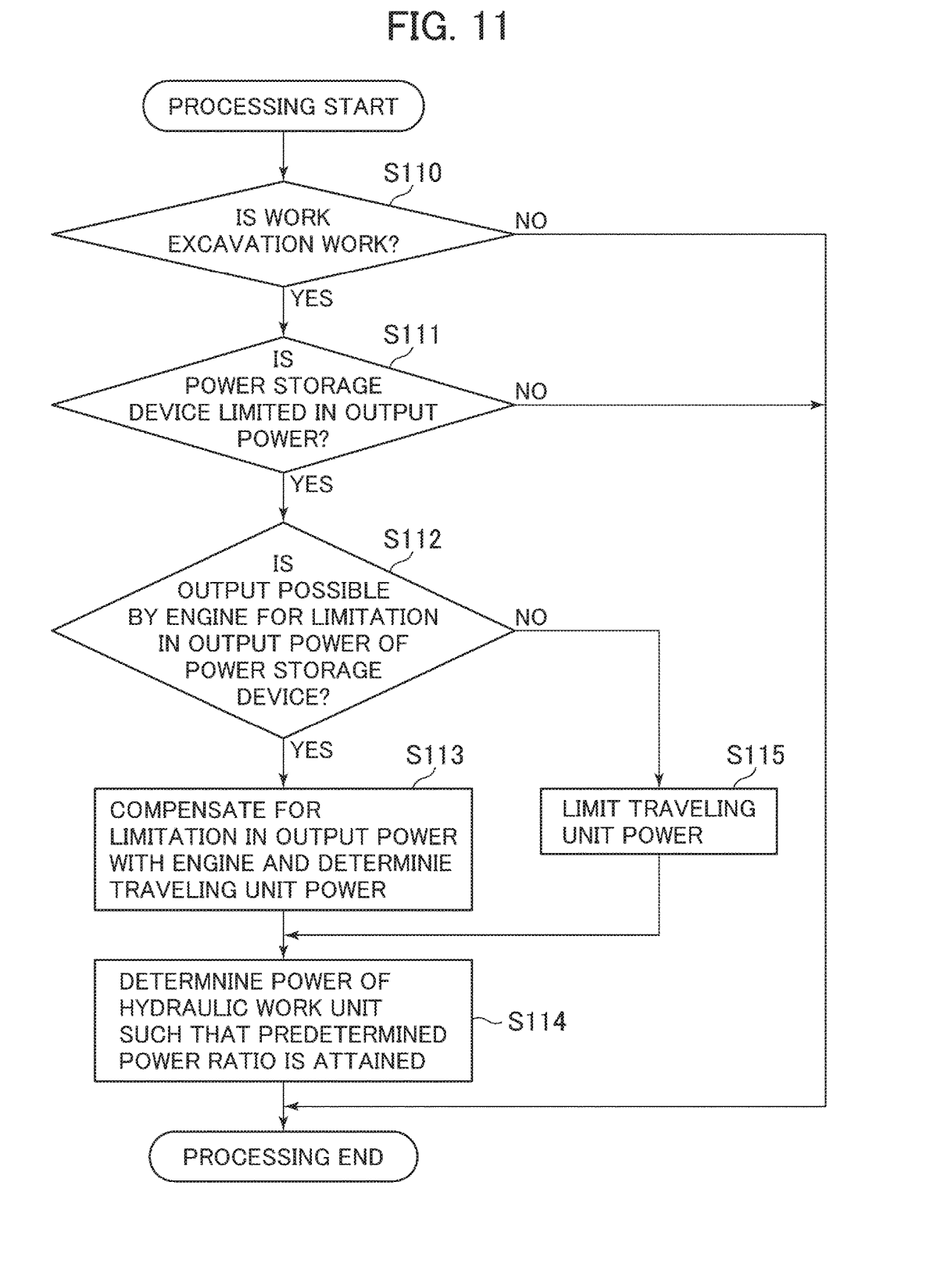
FIG. 11 is a flowchart illustrating the processing procedures for a hybrid control apparatus constituting the hybrid type work vehicle according to a second embodiment of the present invention.

In the following, a hybrid type work vehicle according to the second embodiment of the present invention will be described with reference to the drawings. FIG. 11 is a flowchart illustrating the processing procedures for a hybrid control apparatus constituting the hybrid type work vehicle according to the second embodiment of the present invention.

The construction and operating method of the hybrid work vehicle according to the present embodiment are substantially the same as those of the first embodiment. The first embodiment is applied to a hybrid system equipped with the power storage device 11 of a large capacity and designed with a view to using the power of the power storage device 11 in the normal operation (i.e., the engine 1 is reduced in size), whereas the second embodiment is applied to a hybrid system which is equipped with an engine 1 the capacity of which is large to a certain degree and in which the power of the power storage device 11 is used only for the purpose of assisting when there is a shortage of power of the engine 1.

The processing by the operation determination section 30 and the power computation section 31 in the present embodiment will be described with reference to the drawings. FIG. 11 is a flowchart illustrating the processing procedures for a hybrid control apparatus constituting the hybrid type work vehicle according to the second embodiment of the present invention.

The operation determination section 30 of the hybrid control apparatus 20 determines whether or not the current work being performed by the wheel loader is an excavation work (step S110). More specifically, the operation computation section 42 of the operation determination section 30 inputs the vehicle speed, the bucket position signal, the hydraulic power requirement value Pf, and the traveling power requirement value Prun, and compares the input signals with the previously determined threshold values, whereby it is determined whether or not the current work is an excavating work. In the case where it is determined the current work being performed by the wheel loader is an excavating work, the operation determination section 30 advances to step S111. Otherwise, the processing is completed.

The power computation section 31 of the hybrid control apparatus 20 determines whether or not output power limitation for the power storage device 11 has been generated (step S111). More specifically, the power computation section 31 makes the determination based on whether or not an output power limitation command signal from the power storage device exists. For example, in the case where the temperature of the lithium battery has been increased to exceed the threshold value or in the case where the value of the output electric current exceeds the threshold value, the output power limitation command is outputted. In the case where it is determined that output power limitation for the power storage device 11 has been generated, the power computation section 31 advances to step S112. Otherwise, the processing is completed.

The power computation section 31 of the hybrid control apparatus 20 determines whether or not power output is possible by the engine 1 with respect to the output power limitation for the power storage device 11 (step S112). More specifically, the power computation section 31 determines whether or not the output of power is possible by the engine 1 in an amount corresponding to the limitation with respect to the output power limitation amount from the power storage device 11 (whether or not the current engine 1 has output power in reserve). In the case where the power computation section 31 determines that power output is possible for the engine 1 with respect to the output power limitation for the power storage device 11, the procedure advances to step S113. Otherwise, the procedure advances to step S115.

The power computation section 31 of the hybrid control apparatus 20 compensates for the output power with the engine 1, and determines the traveling unit power (step S113). More specifically, by increasing the output power of the engine 1, it determines the traveling unit power while compensating for the output power limitation for the power storage device 11.

In the case where, in step S112, it is determined that it is not possible to effect power output by the engine 1 with respect to the output power limitation for the power storage device 11, the power computation section 31 of the hybrid control apparatus 20 executes the limitation of the traveling unit power (step S115). More specifically, the power computation section 31 limits the traveling power requirement value Prun in accordance with the output power limitation amount from the power storage device 11, and outputs it as the traveling unit power command.

The power computation section 31 of the hybrid control apparatus 20 executes the limitation of the hydraulic work unit power such that the preset ratio is attained between the traveling unit power and the hydraulic work unit power (step S114). More specifically, the power computation section 31 adjusts the hydraulic power requirement value Pf to determine the hydraulic work unit power such that it is in a predetermined power ratio with respect to the output-limited traveling power command or the output-compensated traveling power command, and outputs it as the hydraulic work unit power command.

In the hybrid type work vehicle according to the second embodiment of the present invention described above, it is possible to achieve the same effect as that of the first embodiment described above.

Further, in the hybrid type work vehicle according to the second embodiment of the present invention described above, it is possible to provide a wheel loader in which high operational efficiency is attained without limiting the power of the vehicle itself even in the case where output power limitation is generated in the power storage device 11.

The present invention is not restricted to the above-described embodiments but includes various modifications. For example, the above embodiments, which have been described in detail with a view to facilitating the understanding of the present invention, are not always restricted to the constructions equipped with all the components described above.

DESCRIPTION OF REFERENCE CHARACTERS

1: Engine
2: Torque converter
3: Transmission (T/M)
4: Hydraulic pump
6: Motor generator (M/G)
7: Inverter
8: Propeller shaft
9: Traveling electric motor
10: Inverter
11: Power storage device
12: DC-DC converter
20: Hybrid control apparatus
21: Engine control device
22: Converter control device
23: Hydraulic control device
24: Inverter control device
30: Operation determination section
31: Power computation section
32: Engine control section
33: M/G control section
34: Hydraulic control section
35: Traveling control section
40: Hydraulic power requirement computation section
41: Traveling power requirement computation section
42: Operation computation section
50: Work device
60: Track structure
61: Wheel
200: Control system
Pf: Hydraulic power requirement value
Prun: Traveling power requirement value

The invention claimed is:

1. A hybrid type work vehicle comprising:
a power source including an engine and a power storage device;
a traveling unit having a generator motor connected to an output shaft of the engine, a wheel, a traveling electric motor driving the wheel, and an inverter transferring electric power between the power storage device and each of the generator motor and the traveling electric motor;
a hydraulic work unit having a hydraulic pump connected to a rotation shaft of the generator motor, and a plurality of hydraulic actuators driven by a hydraulic fluid supplied from the hydraulic pump;
an accelerator pedal controlling a revolution speed of the engine;
a brake pedal controlling a braking device of the wheel;
an operation lever device commanding the driving of the plurality of hydraulic actuators; and
a control apparatus configured to input a depression amount of the accelerator pedal, a depression amount of the brake pedal, an operation amount of the operation lever device, a vehicle speed detected by a speed sensor, and an output power limitation signal of the power storage device, the control apparatus also being configured to determine a current operation state of the vehicle, and to input an output value of the engine and an output value of the power storage device, and to calculate and control a power of the traveling unit and a power of the hydraulic work unit, wherein
the control apparatus is configured such that when the current operation state is determined to be that of an excavation work which is a combined operation of the traveling unit and the hydraulic work unit and the output power limitation signal is outputted, the control apparatus limits the output power of the traveling unit and performs a control to decrease the tilting angle of the hydraulic pump such that a ratio between the output power of the traveling unit and the output power of the hydraulic work unit is maintained at a preset ratio.

2. The hybrid type work vehicle according to claim 1, wherein the control apparatus is configured such that when the current vehicle operation state is determined to be that of the excavation work which is the combined operation of the traveling unit and the hydraulic work unit and the output power limitation signal is outputted, the control apparatus compensates for the output power corresponding to the output power limitation signal with an increase in the output power of the engine.

3. The hybrid type work vehicle according to claim 1, further comprising a forward/rearward switch for selecting between forward and rearward as a direction of travel of the vehicle, wherein the control apparatus is configured to input a signal of the forward/rearward switch, and the revolution speed of the traveling electric motor from the inverter instead of the vehicle speed.

* * * * *